US012761184B2

(12) United States Patent
Okaya et al.

(10) Patent No.: US 12,761,184 B2
(45) Date of Patent: Oct. 13, 2026

(54) AUTONOMOUS UNDERWATER VEHICLE

(71) Applicant: KAWASAKI JUKOGYO KABUSHIKI KAISHA, Kobe (JP)

(72) Inventors: Noriyuki Okaya, Kobe (JP); Koichi Fukui, Kobe (JP); Hiroaki Nakano, Kobe (JP); Yuji Kamei, Kobe (JP); Shuichi Mizuma, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 125 days.

(21) Appl. No.: 18/872,633

(22) PCT Filed: May 30, 2023

(86) PCT No.: PCT/JP2023/020047
§ 371 (c)(1),
(2) Date: Dec. 6, 2024

(87) PCT Pub. No.: WO2023/238733
PCT Pub. Date: Dec. 14, 2023

(65) Prior Publication Data
US 2025/0354957 A1 Nov. 20, 2025

(30) Foreign Application Priority Data
Jun. 9, 2022 (JP) ................................ 2022-093462

(51) Int. Cl.
*G01N 27/60* (2006.01)
*B63G 8/00* (2006.01)

(52) U.S. Cl.
CPC ............. *G01N 27/60* (2013.01); *B63G 8/001* (2013.01); *B63B 2213/00* (2013.01); *B63G 2008/004* (2013.01)

(58) Field of Classification Search
CPC .. G01N 27/60; B63G 8/001; B63G 2008/004; B63B 2213/00; C23F 2213/31; C23F 13/22; C23F 2213/32; B63C 11/52
See application file for complete search history.

(56) References Cited

U.S. PATENT DOCUMENTS 10,351,212 B2 * 7/2019 Jourdan ................. B63G 8/001
11,193,772 B1 * 12/2021 Kinnaman ............. G01C 21/16
(Continued)

FOREIGN PATENT DOCUMENTS

JP H11-72458 A 3/1999

*Primary Examiner* — Alvaro E Fortich
(74) *Attorney, Agent, or Firm* — Oliff PLC

(57) ABSTRACT

An AUV includes: a position detector that detects its position relative to an underwater structure; a propulsor; and control circuitry configured to control the propulsor and grasp a position of the AUV; an underwater potential sensor that three-dimensionally measures a potential gradient in water; and a metal potential sensor that inspects an electric field producing body that is a part of the underwater structure or a sacrificial anode. The control circuitry specifies a position of the body by mapping an underwater electric field from the potential gradient measured by the sensor in accordance with movement of the AUV. The control circuitry controls the propulsor such that the AUV moves to and stops at an inspection position that is a position at which the metal potential sensor is opposed to the body. In this state, the control circuitry makes the metal potential sensor inspect the body.

6 Claims, 5 Drawing Sheets

(56) References Cited

U.S. PATENT DOCUMENTS

| | | | | |
|---|---|---|---|---|
| 2015/0346726 | A1* | 12/2015 | Davoodi | B63B 22/02 440/38 |
| 2016/0097875 | A1* | 4/2016 | Kowalczyk | B63G 8/001 701/21 |
| 2018/0290717 | A1* | 10/2018 | Byrd | C23F 13/22 |
| 2020/0241162 | A1* | 7/2020 | Majima | G01V 3/165 |

* cited by examiner

AUTONOMOUS UNDERWATER VEHICLE

CROSS-REFERENCE TO RELATED APPLICATIONS

This is a National Phase of International Patent Application No. PCT/JP2023/020047 filed May 30, 2023, which claims the benefit of Japanese Application No. 2022-093462 filed Jun. 9, 2022. The disclosure of the prior applications is hereby incorporated by reference herein in its entirety.

TECHNICAL FIELD

The present disclosure relates to an autonomous underwater vehicle.

BACKGROUND ART

Electrical corrosion protection using a sacrificial anode has been performed with respect to underwater structures made of steel materials. Such sacrificial anode produces an electric field in water. Moreover, when a coating film of the steel material of the underwater structure is peeled off, or the steel material is corroded, the electric field is produced in water.

For example, PTL 1 discloses a method of determining a consumed state of the sacrificial anode, a deterioration state of the coating film of the steel material, and a corrosion state of the steel material by two-dimensionally measuring a potential gradient in water on a plane orthogonal to a surface of the underwater structure and showing the result of this measurement in a three-dimensional graph. Moreover, PTL 1 describes that the potential gradient in water may be measured by using a remotely operated vehicle (ROV).

CITATION LIST

Patent Literature

PTL 1: Japanese Laid-Open Patent Application Publication No. 11-72458

SUMMARY OF INVENTION

Technical Problem

When using the ROV, an operator operates the ROV while watching a camera video image taken by a camera mounted on the ROV. Therefore, when an electric field producing body, which is the sacrificial anode, a metal exposed portion of the steel material, or a corroded portion of the steel material, is inspected by using the ROV, but the electric field producing body cannot be visually confirmed by the camera video image due to high turbidity in water, it is difficult to make the ROV approach and inspect the electric field producing body. In addition, when using the ROV, an ocean support ship and workers are required, and the cost is high.

On the other hand, when using an autonomous underwater vehicle (AUV), the electric field producing body can be inspected regardless of the turbidity in water, and the ocean support ship is not required.

An object of the present disclosure is to provide an autonomous underwater vehicle that can inspect an electric field producing body.

Solution to Problem

The present disclosure provides an autonomous underwater vehicle including: a position detector that detects a position of the position detector relative to an underwater structure; a propulsor; control circuitry configured to control the propulsor based on a detection result of the position detector such that the autonomous underwater vehicle moves along the underwater structure and grasp a position of the autonomous underwater vehicle; an underwater potential sensor that three-dimensionally measures a potential gradient in water; and a metal potential sensor that inspects an electric field producing body that is a part of the underwater structure or a sacrificial anode, wherein: the control circuitry specifies a position of the electric field producing body by mapping an underwater electric field from the potential gradient measured by the underwater potential sensor in accordance with movement of the autonomous underwater vehicle; the control circuitry controls the propulsor such that the autonomous underwater vehicle moves to and stops at an inspection position that is a position at which the metal potential sensor is opposed to the electric field producing body; and in this state, the control circuitry makes the metal potential sensor inspect the electric field producing body.

Advantageous Effects of Invention

The present disclosure provides an autonomous underwater vehicle that can inspect an electric field producing body.

BRIEF DESCRIPTION OF DRAWINGS

FIG. 5A is a diagram when viewed from a lateral side of the pipeline. FIG. 5B is a sectional view taken along line VB-VB of FIG. 5A.

DESCRIPTION OF EMBODIMENTS

Figure 1:
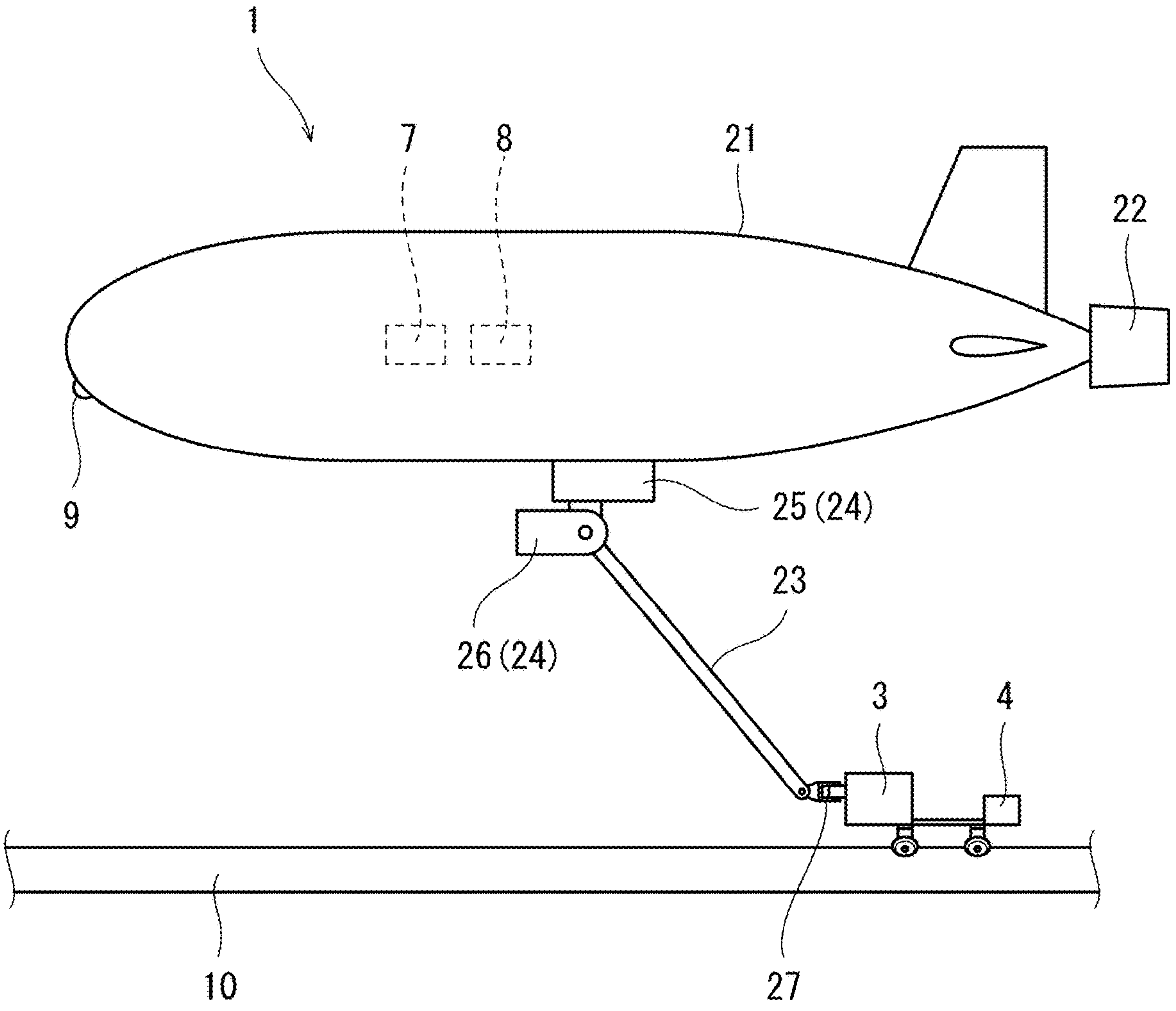
FIG. 1 is a side view of an autonomous underwater vehicle according to one embodiment.

FIG. 1 shows an autonomous underwater vehicle (AUV) 1 according to one embodiment. The AUV 1 moves along an underwater structure 10. In the present embodiment, the underwater structure 10 is a seabed pipeline. However, the underwater structure 10 does not necessarily have to be the seabed pipeline and may be, for example, a bridge pier.

Specifically, the AUV 1 includes: a main body 21 having a streamline shape; and a propulsor 22 located at the main body 21. In the present embodiment, as rudder equipment that changes a course and a height, a movable vertical tail and a movable horizontal tail are located at a rear portion of the main body 21. However, the rudder equipment is not limited to this. When the course and the height can be changed only by the propulsor 22, the rudder equipment is omitted, and a fixed wing for stabilizing the posture of the main body 21 may be included.

The propulsor 22 can apply thrust to the main body 21 in a front-rear direction, left-right direction, and upper-lower direction of the main body 21. In addition, the propulsor 22 can apply turning force to the main body 21 in a yaw direction around an upper-lower axis of the main body 21 and a pitch direction around a left-right axis of the main body 21. For example, the propulsor 22 may include thrusters that are directed in different directions from each other or may include a single thruster of a swing type.

A position detector 9 is located at a front portion of the main body 21. Control circuitry 7 and an inertial navigation system 8 (INS) are located inside the main body 21.

The position detector 9 detects a position of the position detector 9 relative to the underwater structure 10. In the present embodiment, the position detector 9 is a sonar that emits an acoustic beam to obtain positional information of the underwater structure 10. However, the position detector 9 may be a laser range finder that emits a light beam.

The control circuitry 7 controls the propulsor 22 based on the detection result of the position detector 9 such that the main body 21 moves along the underwater structure 10. To be specific, the main body 21 moves so as to trace the seabed pipeline as the underwater structure 10 while maintaining a constant distance to the underwater structure 10.

Regarding the control circuitry 7, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The inertial navigation system 8 includes: accelerometers that detect respective accelerations in directions in which three axes orthogonal to each other extend; and gyro sensors that detect respective angular velocities around the three axes. The inertial navigation system 8 calculates a movement direction of the main body 21 from a reference position of the main body 21 and a movement distance of the main body 21 from the reference position of the main body 21, and calculates a current posture of the main body 21.

Based on the movement direction and movement distance of the main body 21 from the reference position of the main body 21 which have been calculated by the inertial navigation system 8, the control circuitry 7 calculates and grasps a position (longitude, latitude, and depth) of the main body 21 in a geographic coordinate system.

An arm 23 is attached to a lower surface of the main body 21 through a driver 24. The driver 24 includes: a first driving portion 25 that turns the arm 23 around the upper-lower axis of the main body 21; and a second driving portion 26 that swings the arm 23 around the left-right axis of the main body 21. The first driving portion 25 and the second driving portion 26 are controlled by the control circuitry 7 in accordance with the position of the main body 21 relative to the underwater structure 10 and the current posture of the main body 21.

A cart 3 is coupled to a tip of the arm 23 through a coupler 27. The coupler 27 couples the cart 3 to the tip of the arm 23 such that the arm 23 can swing around a left-right axis and upper-lower axis of the cart 3. Inspection equipment 4 is attached to the cart 3.

Figure 2:
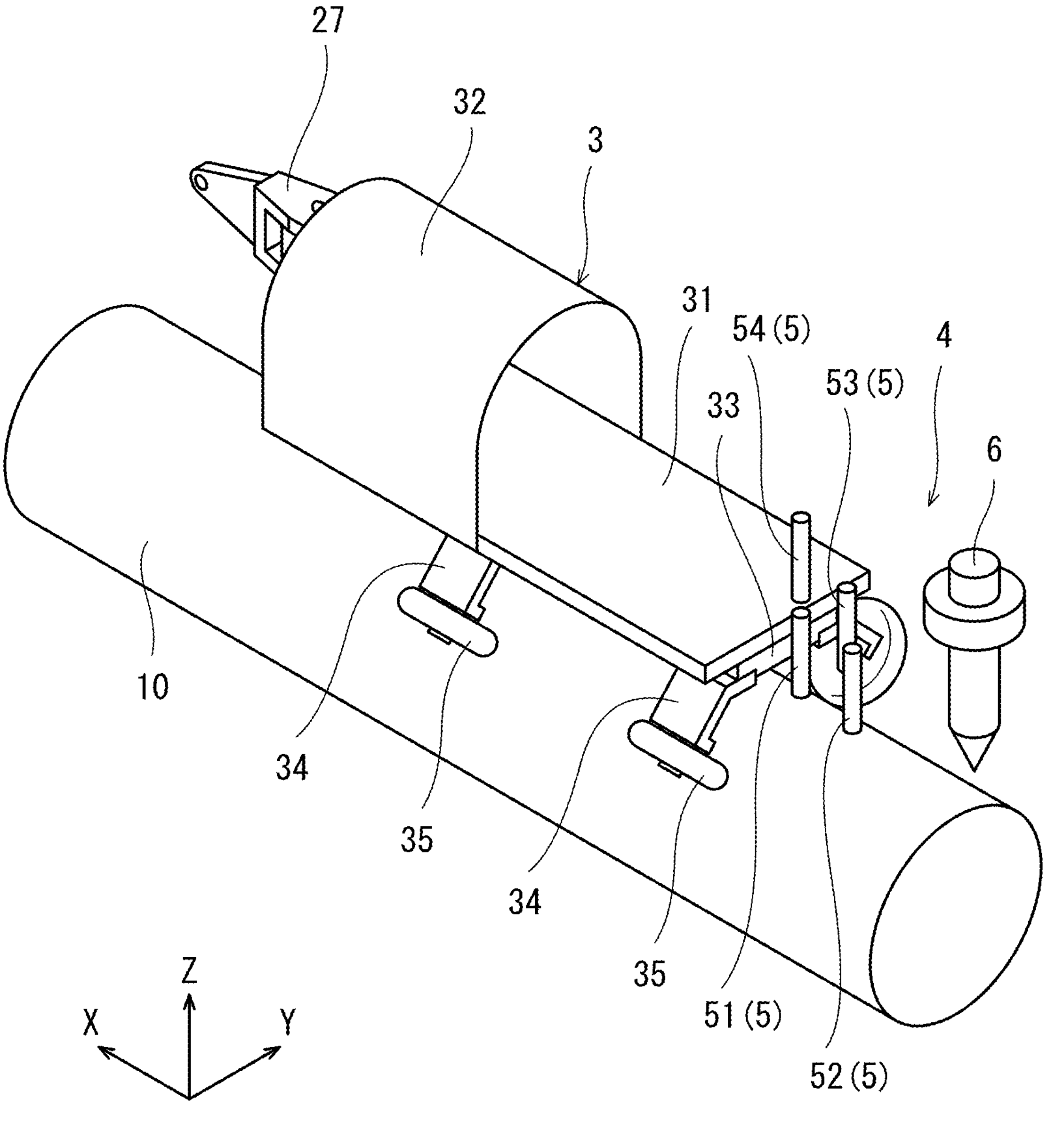
FIG. 2 is a perspective view showing a cart and inspection equipment.
Figure 3:
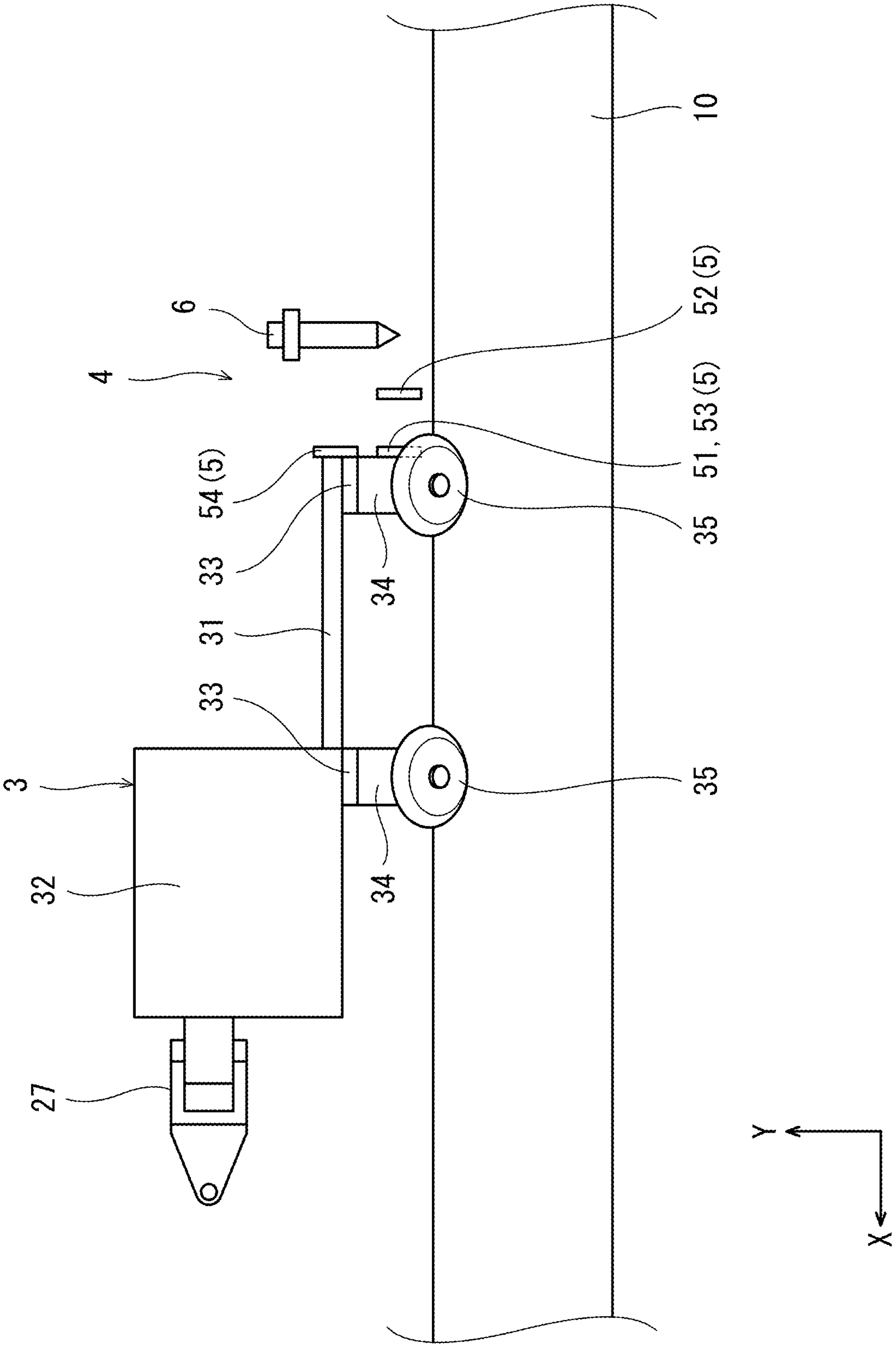
FIG. 3 is a side view showing the cart and the inspection equipment.
Figure 4:
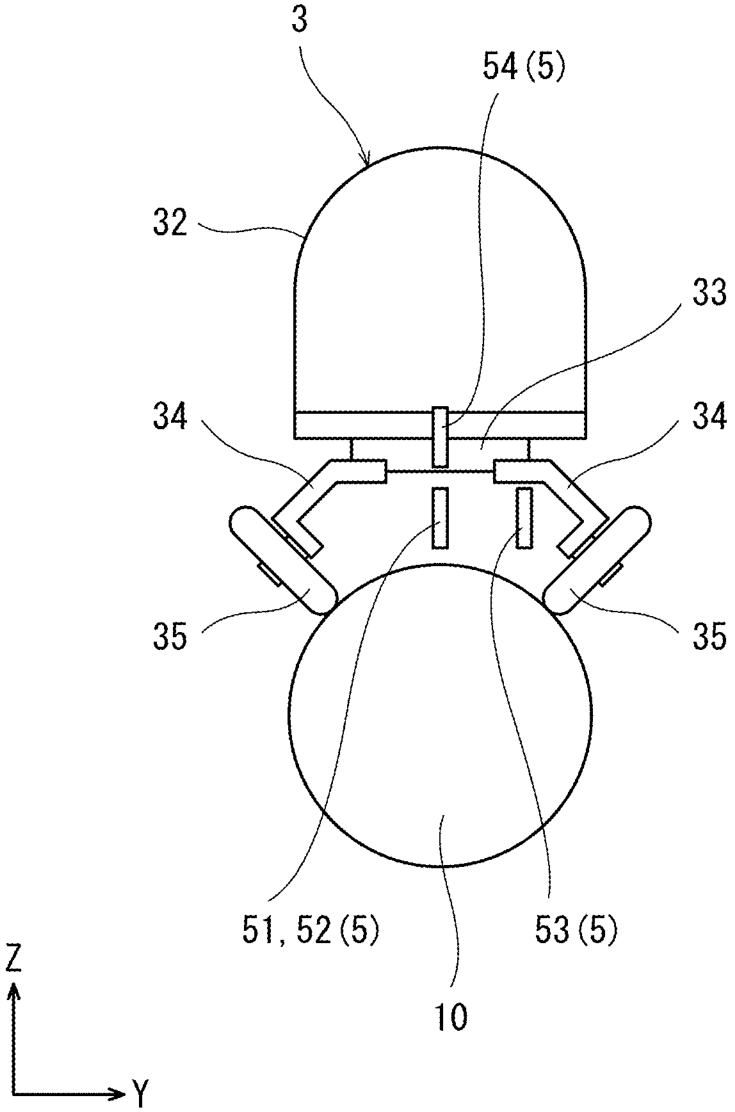
FIG. 4 is a rear view showing the cart and the inspection equipment.

More specifically, as shown in FIGS. 2 to 4, the cart 3 includes: a plate-shaped base 31 that is in parallel with the underwater structure 10; and a cover 32 covering a front portion of the base 31. Two pairs of wheels 35 that roll on the underwater structure 10 are attached to the base 31 through brackets 34 and attaching seats 33. In the present embodiment, since the underwater structure 10 is the seabed pipeline having a circular section, each wheel 35 is inclined at 45° with respect to the upper-lower direction of the cart 3.

The inspection equipment 4 includes: an underwater potential sensor 5 that three-dimensionally measures a potential gradient in water; a metal potential sensor 6 (not shown in FIG. 4) that inspects an electric field producing body that is a part (a metal exposed portion or a corroded portion) of the underwater structure 10 or a sacrificial electrode 11 (see FIG. 5A, 5B, or FIG. 6); and a support that supports the underwater potential sensor 5 and the metal potential sensor 6.

Figure 5A:
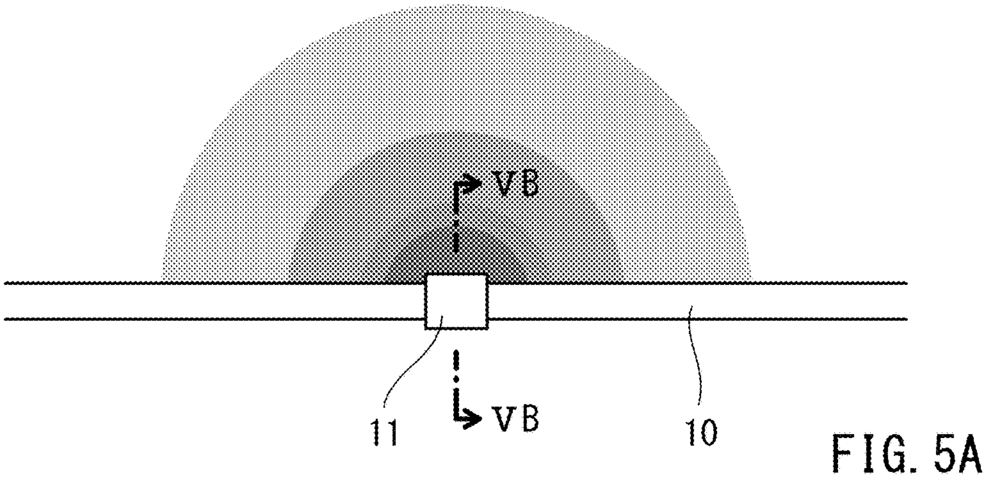
FIGS. 5A and 5B are conceptual diagrams showing an electric field when a sacrificial electrode has a tubular shape surrounding a seabed pipeline.
Figure 5B:
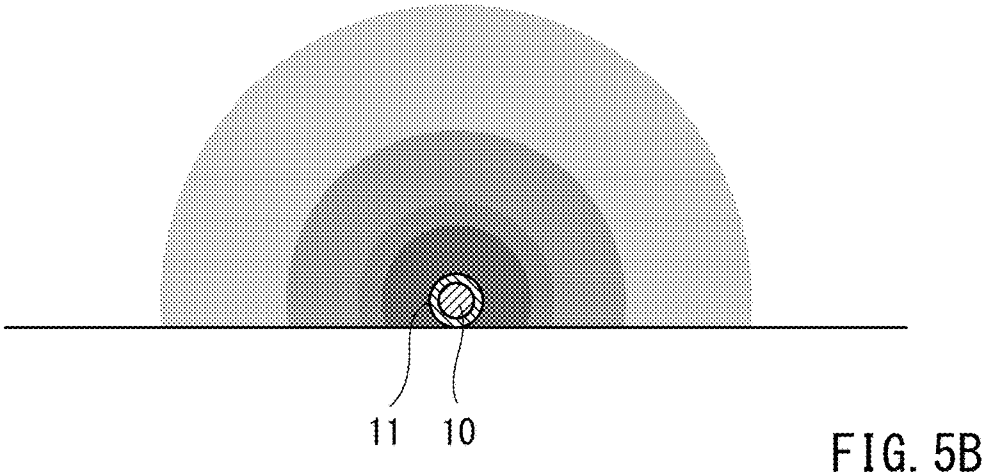
Figure 6:
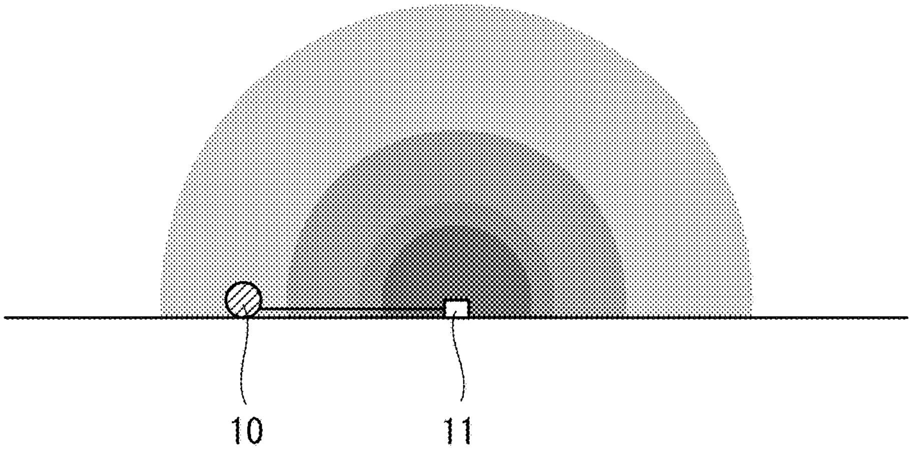
FIG. 6 is a conceptual diagram showing the electric field when the sacrificial electrode is located at a position away from the seabed pipeline.

As shown in FIGS. 5A and 5B, the sacrificial electrode 11 may have a tubular shape surrounding the seabed pipeline that is the underwater structure 10, or as shown in FIG. 6, the sacrificial electrode 11 may be located at a position away from the seabed pipeline. The sacrificial electrode 11 produces an electric field as shown in FIG. 5A, 5B, or 6. When a coating film of the seabed pipeline is peeled off, or the seabed pipeline is corroded, the metal exposed portion or the corroded portion produces the electric field as shown in FIGS. 5A and 5B.

The underwater potential sensor 5 includes: a first reference electrode 51, a second reference electrode 52, and a third reference electrode 53 which are located on an opposing plane opposed to the underwater structure 10; and a fourth reference electrode 54 located above this opposing plane. The second reference electrode 52 is located at a position away from the first reference electrode 51 in a first direction X on the opposing plane. The third reference electrode 53 is located at a position away from the first reference electrode 51 in a second direction Y orthogonal to the first direction X on the opposing plane. The fourth reference electrode 54 is located at a position away from the first reference electrode 51 in a third direction orthogonal to the first direction X and the second direction Y. The first to fourth reference electrodes 51 to 54 are electrochemical electrodes. Examples of the electrochemical electrodes include silver/silver chloride electrodes and saturated calomel electrodes.

In the present embodiment, since the underwater structure 10 is the seabed pipeline, the first direction X is an axial direction of the seabed pipeline, and the second direction Y is a horizontal direction orthogonal to the axial direction of the seabed pipeline. Moreover, at a portion where the seabed pipeline is parallel to a horizontal plane, the third direction Z is a vertical direction.

The inspection of the electric field producing body which is performed by the metal potential sensor 6 is the measurement of the potential of metal that is the electric field producing body. The metal potential sensor 6 includes: a metal chip that is metal-conductive with an inspection target; and a reference electrode. The accuracy of the inspection increases as a distance between the metal chip and a liquid junction portion of the reference electrode decreases.

Next, control performed by the control circuitry 7 will be more specifically described. First, the control circuitry 7 specifies the position of the electric field producing body by mapping the underwater electric field from the potential gradient measured by the underwater potential sensor 5 in accordance with the movement of the AUV 1. Next, the control circuitry 7 controls the propulsor 22 such that the AUV 1 moves to and stops at an inspection position that is a position at which the metal potential sensor 6 is opposed to the electric field producing body. In this state, the control circuitry 7 makes the metal potential sensor 6 inspect the electric field producing body.

As described above, according to the AUV 1 of the present embodiment, since the underwater potential sensor 5 three-dimensionally measures the potential gradient in water, the position of the electric field producing body can be specified. Moreover, when the position of the electric field producing body is specified, autonomous movement to the inspection position and autonomous inspection are performed by the control of the control circuitry 7. Therefore, the electric field producing body can be inspected by using the AUV 1.

Modified Example

The present disclosure is not limited to the above embodiment, and various modifications may be made within the scope of the present disclosure.

For example, the control circuitry 7 may control the propulsor 22 such that when the distance from the AUV 1 to the electric field producing body is a predetermined value or less, the speed of the AUV 1 decreases. According to this configuration, the potential gradient in water can be measured at short distance intervals by the decrease in the speed of the AUV 1. Therefore, the position of the electric field producing body can be accurately specified.

CONCLUSION

As a first aspect, the present disclosure provides an autonomous underwater vehicle including: a position detector that detects a position of the position detector relative to an underwater structure; a propulsor; control circuitry configured to control the propulsor based on a detection result of the position detector such that the autonomous underwater vehicle moves along the underwater structure and grasp a position of the autonomous underwater vehicle; an underwater potential sensor that three-dimensionally measures a potential gradient in water; and a metal potential sensor that inspects an electric field producing body that is a part of the underwater structure or a sacrificial anode, wherein: the control circuitry specifies a position of the electric field producing body by mapping an underwater electric field from the potential gradient measured by the underwater potential sensor in accordance with movement of the autonomous underwater vehicle; the control circuitry controls the propulsor such that the autonomous underwater vehicle moves to and stops at an inspection position that is a position at which the metal potential sensor is opposed to the electric field producing body; and in this state, the control circuitry makes the metal potential sensor inspect the electric field producing body.

According to the above configuration, since the underwater potential sensor three-dimensionally measures the potential gradient in water, the position of the electric field producing body can be specified. Moreover, when the position of the electric field producing body is specified, the autonomous movement to the inspection position and the autonomous inspection are performed by the control of the control circuitry. Therefore, the electric field producing body can be inspected by using the autonomous underwater vehicle.

As a second aspect, in addition to the first aspect, for example, the underwater potential sensor may include: a first reference electrode; a second reference electrode located at a position away from the first reference electrode in a first direction on an opposing plane opposed to the underwater structure; a third reference electrode located at a position away from the first reference electrode in a second direction orthogonal to the first direction on the opposing plane; and a fourth reference electrode located at a position away from the first reference electrode in a third direction orthogonal to the first direction and the second direction.

As a third aspect, in addition to the second aspect, for example, the underwater structure may include a seabed pipeline, and the first direction may be an axial direction of the seabed pipeline.

As a fourth aspect, in addition to any one of the first to third aspects, the control circuitry may control the propulsor such that when a distance from the autonomous underwater vehicle to the electric field producing body is a predetermined value or less, a speed of the autonomous underwater vehicle decreases. According to this configuration, the potential gradient in water can be measured at short distance intervals by the decrease in the speed of the autonomous underwater vehicle. Therefore, the position of the electric field producing body can be accurately specified.

The invention claimed is:

1. An autonomous underwater vehicle comprising:

a position detector that detects a position of the position detector relative to an underwater structure;

a propulsor;

control circuitry configured to control the propulsor based on a detection result of the position detector such that the autonomous underwater vehicle moves along the underwater structure and grasp a position of the autonomous underwater vehicle;

an underwater potential sensor that three-dimensionally measures a potential gradient in water; and a metal potential sensor that inspects an electric field producing body that is a part of the underwater structure or a sacrificial anode, wherein:

the control circuitry specifies a position of the electric field producing body by mapping an underwater electric field from the potential gradient measured by the underwater potential sensor in accordance with movement of the autonomous underwater vehicle;

the control circuitry controls the propulsor such that the autonomous underwater vehicle moves to and stops at an inspection position that is a position at which the metal potential sensor is opposed to the electric field producing body; and in this state, the control circuitry makes the metal potential sensor inspect the electric field producing body.

2. The autonomous underwater vehicle according to claim 1, wherein the underwater potential sensor includes:

a first reference electrode;

a second reference electrode located at a position away from the first reference electrode in a first direction on an opposing plane opposed to the underwater structure;

a third reference electrode located at a position away from the first reference electrode in a second direction orthogonal to the first direction on the opposing plane; and a fourth reference electrode located at a position away from the first reference electrode in a third direction orthogonal to the first direction and the second direction.

3. The autonomous underwater vehicle according to claim 2, wherein:

the underwater structure includes a seabed pipeline; and the first direction is an axial direction of the seabed pipeline.

4. The autonomous underwater vehicle according to claim 1, wherein the control circuitry controls the propulsor such that when a distance from the autonomous underwater vehicle to the electric field producing body is a predetermined value or less, a speed of the autonomous underwater vehicle decreases.

5. The autonomous underwater vehicle according to claim 2, wherein the control circuitry controls the propulsor such that when a distance from the autonomous underwater vehicle to the electric field producing body is a predetermined value or less, a speed of the autonomous underwater vehicle decreases.

6. The autonomous underwater vehicle according to claim 3, wherein the control circuitry controls the propulsor such that when a distance from the autonomous underwater vehicle to the electric field producing body is a predetermined value or less, a speed of the autonomous underwater vehicle decreases.

* * * * *